United States Patent
Francisco et al.

(10) Patent No.: US 9,260,194 B2
(45) Date of Patent: Feb. 16, 2016

(54) GIMBAL PIN FOR JET PROPULSION SYSTEM

(71) Applicant: ROHR, INC., Chula Vista, CA (US)

(72) Inventors: Jay Francisco, Chula Vista, CA (US); Jimmy Kee, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 359 days.

(21) Appl. No.: 14/062,733

(22) Filed: Oct. 24, 2013

(65) Prior Publication Data

US 2015/0115061 A1 Apr. 30, 2015

(51) Int. Cl.
*B64D 33/04* (2006.01)
*F02K 1/76* (2006.01)
*B64D 29/00* (2006.01)

(52) U.S. Cl.
CPC ............... *B64D 33/04* (2013.01); *B64D 29/00* (2013.01); *F02K 1/763* (2013.01); *F05D 2260/50* (2013.01)

(58) Field of Classification Search
CPC . F02C 7/32; F05D 2250/411; F05D 2250/42; F05D 2260/30; F05D 2260/50; F02K 1/54; F02K 1/763; F02K 1/80; B64D 33/04
See application file for complete search history.

(56) References Cited

U.S. PATENT DOCUMENTS

| | | | |
|---|---|---|---|
| 6,625,972 B1 * | 9/2003 | Sternberger | F02K 1/76 239/265.29 |
| 2009/0126151 A1 | 5/2009 | Sternberger | |
| 2010/0326047 A1 | 12/2010 | Gabel | |

FOREIGN PATENT DOCUMENTS

| | | | |
|---|---|---|---|
| EP | 0984150 | 3/2000 | |
| EP | 2311731 | 4/2011 | |
| WO | WO2013093283 A1 * | 6/2013 | F02K 1/62 |

OTHER PUBLICATIONS

Extended European Search Report dated Mar. 10, 2015 in European Application No. 14187936.1.

* cited by examiner

*Primary Examiner* — Andrew Nguyen
(74) *Attorney, Agent, or Firm* — Snell & Wilmer L.L.P.

(57) ABSTRACT

A thrust reverser actuator gimbal assembly for mounting a thrust reverser actuator to fixed structure of the thrust reverser is disclosed. The thrust reverser actuator gimbal assembly may comprise a gimbal, first and second gimbal pins mounted to the gimbal and defining a first pivot axis, the first and second gimbal pins adapted to form a pivotal joint with the fixed structure of the thrust reverser, third and fourth gimbal pins mounted to the gimbal and defining a second pivot axis normal to the first pivot axis, the third and fourth gimbal pins adapted to form a pivotal joint with the thrust reverser actuator, wherein the first and second gimbal pins each include a shaft and a flange integrally formed together, the flange including a pair of bores for receiving a fastener to fasten the respective gimbal pin to the thrust reverser fixed structure.

7 Claims, 6 Drawing Sheets

GIMBAL PIN FOR JET PROPULSION SYSTEM

FIELD

The present disclosure relates to jet engine propulsion systems, and more particularly, to jet engine nacelles.

BACKGROUND

Jet engines, such as those that power modern commercial aircraft, typically include thrust reversing structures (or thrust reversers). The thrust reverser typically includes an extendable thrust reverser actuator which mounts on one end thereof to a fixed structure of the thrust reverser via a gimbal. The gimbal is desirably lightweight, and capable of withstanding the loads and vibrations it is subjected to without excess wear or fatigue.

SUMMARY

A thrust reverser actuator gimbal assembly for mounting a thrust reverser actuator to fixed structure of the thrust reverser is disclosed. The thrust reverser actuator gimbal assembly may comprise a gimbal, first and second gimbal pins mounted to the gimbal and defining a first pivot axis, the first and second gimbal pins adapted to form a pivotal joint with the fixed structure of the thrust reverser, third and fourth gimbal pins mounted to the gimbal and defining a second pivot axis normal to the first pivot axis, the third and fourth gimbal pins adapted to form a pivotal joint with the thrust reverser actuator, wherein the first and second gimbal pins each include a shaft and a flange integrally formed together, the flange including a pair of bores for receiving a fastener to fasten the respective gimbal pin to the thrust reverser fixed structure. Each shaft of the respective first and second gimbal pin may extend perpendicular to its respective integrally formed flange. Each shaft and flange of the respective first and second gimbal pins may be forged as a single component.

A thrust reverser actuator gimbal assembly is disclosed. The thrust reverser actuator gimbal assembly may comprise a gimbal, an extendable thrust reverser actuator, first and second gimbal pins defining a first pivot axis, the first and second gimbal pins adapted to form a pivotal joint with a fixed structure of the thrust reverser, third and fourth gimbal pins mounted between the gimbal and the thrust reverser actuator and creating a pivotal joint therebetween, and defining a second pivot axis normal to the first pivot axis, wherein the first and second gimbal pins each include a shaft and a flange integrally formed together, the flange including a pair of bores for receiving a fastener to fasten the respective gimbal pin to the thrust reverser fixed structure. The flange and the shaft may be forged as a single component. The fixed structure may comprise a front fitting forming a portion of a thrust reverser. The front fitting may couple to a torque box of the thrust reverser structure.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
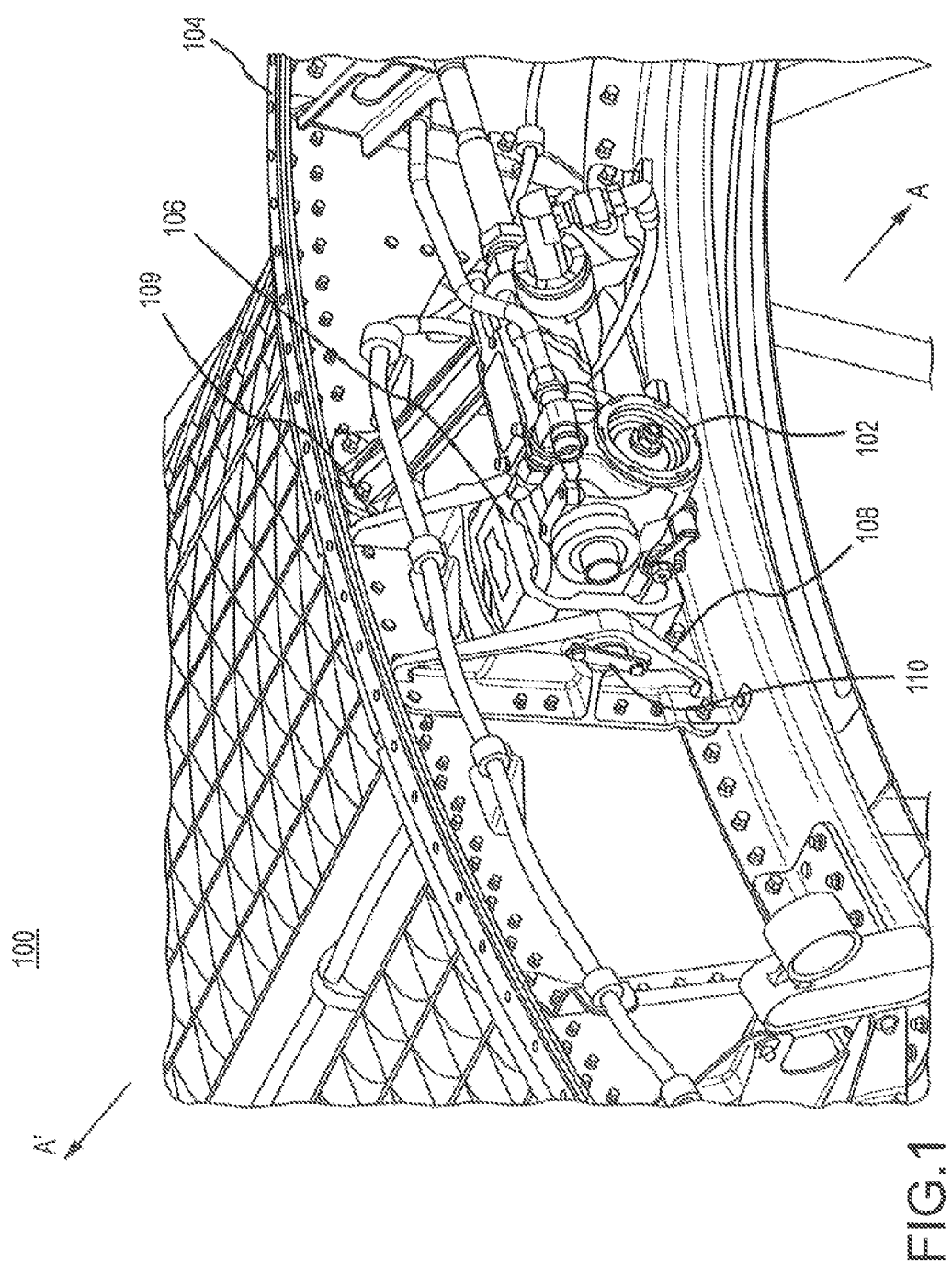
FIG. 1 illustrates, in accordance with various embodiments, a perspective view of a portion of a thrust reverser.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine. As used herein, "forward" refers to the directed associated with the nose (e.g., the front end) of an aircraft, or generally, to the direction of flight or motion.

Generally, a typical jet engine propulsion system (i.e., a system comprising a jet engine and nacelle) includes a thrust reversing system (or simply a thrust reverser). The thrust reverser may comprise a torque box, a cascade array, a translating sleeve, and a plurality of blocker doors. The torque box comprises a load bearing structure typically radially formed about the central axis of the propulsion system.

The cascade array comprises a plurality of vents that redirect airflow during certain operations (e.g., landing) to generate reverse thrust. The translating sleeve comprises a structure situated, in a stowed configuration, concentrically about a cascade array. The Mocker doors are coupled to the translating sleeve, and lower or deploy within a bypass air duct defined by the translating sleeve inner surface and an inner fixed structure outer surface to redirect fan air through the cascade array. The translating sleeve may be coupled to one or more track beams each of which may help define a linear track or bearing along which the translating sleeve rides. Each track beam may be coupled to the torque box on an end thereof.

During a thrust reversing operation, the translating sleeve is urged aft by a series of thrust reverser actuator assemblies that form part of a thrust reverser actuation system ("TRAS"). Each actuator extends between and is coupled to a translating sleeve and the torque box. The actuators couple to the torque box via a gimbal assembly in a known manner. When the actuators of the TRAS extend, the translating sleeve translates, as described above, along the track beam. As the translating sleeve translates aft, the cascade array is exposed, and the blocker doors are lowered into the bypass air duct. As this occurs, airflow is redirected by the blocker doors through the cascade array.

The velocity of airflow reflected by each blocker door is significant. Thus, each blocker door—as well as each component coupled within the thrust reverser—is subject to stress. The gimbal pins which mount the TRAs to the torque box are subject to large stresses and vibrations. Thus, as described below, alternative and improved gimbal pin designs are desirable.

Therefore, with reference to FIG. 1, a perspective view of a portion of an exemplary embodiment of a thrust reverser 100 of a jet engine nacelle is shown. The thrust reverser 100 may comprise a torque box 104, and, as better shown in FIGS. 3A and 3B, a thrust reverser actuator gimbal assembly 300.

The thrust reverser actuator gimbal assembly 300 may comprise a gimbal 106, one or more front fittings 108 and 109, one or more gimbal pins 110 and 111, and/or an actuator 102. The thrust reverser 100 may extend from forward to aft substantially parallel to the axis marked as A-A' in the figures. As shown, point A may be referred to as forward of point A' and A' may be referred to as aft of point A.

In operation, the thrust reverser actuator gimbal assembly 300 may flexibly or pivotally mount the actuator 102 to the torque box 104. In particular, the thrust reverser actuator gimbal assembly 300 may permit the actuator 102 to pivot relative to a first axis defined between the gimbal pins 110 and 111. Similarly, the thrust reverser actuator gimbal assembly may permit the actuator 102 to pivot with respect to a second axis normal to the first axis and defined between the gimbal pins 120 and 121.

As described above, the torque box 104 is typically radially formed around the central axis of the propulsion system and has a box beam type of construction.

A typical gimbal pin may experience wear from vibration during flight, takeoff, and Landing. FIG. 1 shows one typical gimbal pin construction where the gimbal pin comprises a straight pin positioned in a bore to form a pivotal joint, and a retaining plate which covers the pin and prevents it from vibrating out of the bore. However, it has been observed by the inventors that certain vibratory conditions can cause the pin to rotate in its bore which can contribute to accelerated wear.

Figure 2A:
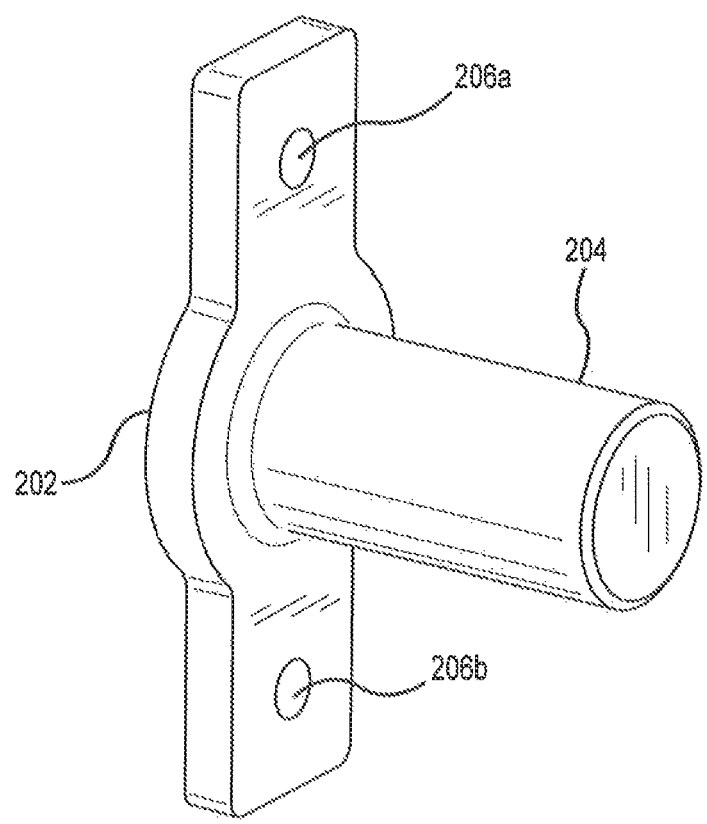
FIG. 2A illustrates, in accordance with various embodiments, a perspective view of a gimbal pin.
Figure 2B:
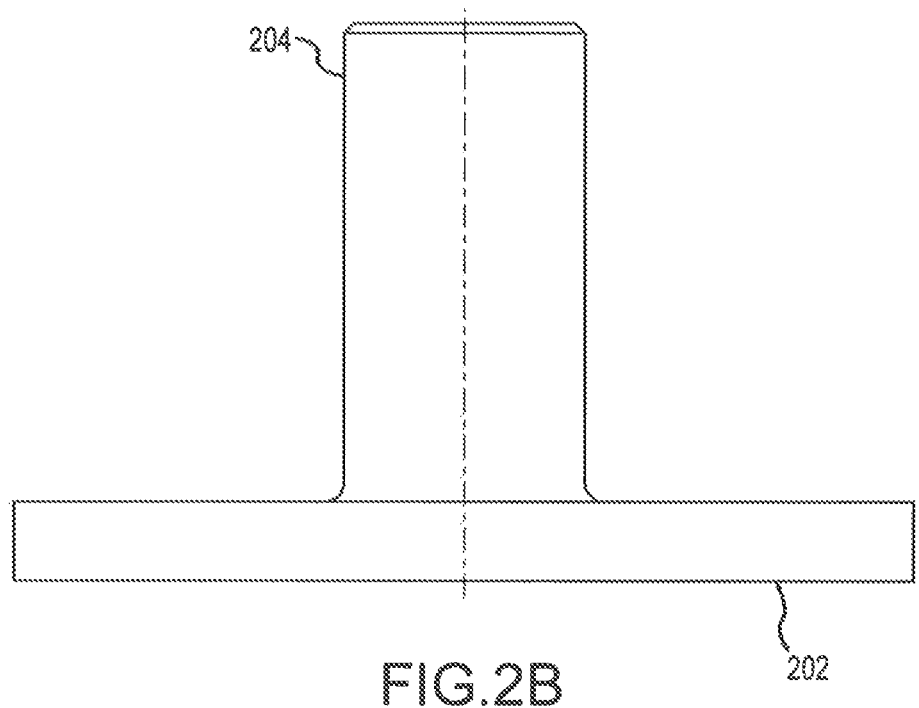
FIG. 2B illustrates, in accordance with various embodiments, a side view of a gimbal pin.
Figure 2C:
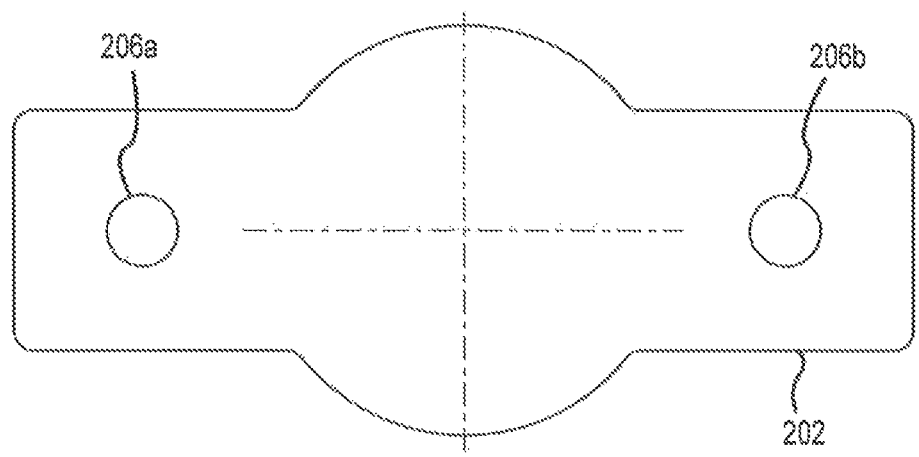
FIG. 2C illustrates, in accordance with various embodiments, a top view of a gimbal pin.

As shown with respect to FIGS. 2A-2C, an improved gimbal pin 110 may comprise a single, integral component. The gimbal pin 110 may be manufactured in any suitable manner, provided that it is formed as a single, unitary, body. For example, the gimbal pin 110 may be manufactured or formed by way of a casting process, a forging process, a machining process, a deposition process, and/or the like.

The gimbal pin 110 may comprise a flange 202 and/or a shaft 204. The flange 202 may include one or more apertures, bores, or cavities 206a and/or 206b, through which a coupling member may be fitted. An aperture 206a and/or 206b may comprise a coupling receptacle that receives a coupling member, such as a rivet, a screw, a bolt, and the like. Apertures 206a and 206b may be bounded by an interior surface of flange 202.

Figure 3A:
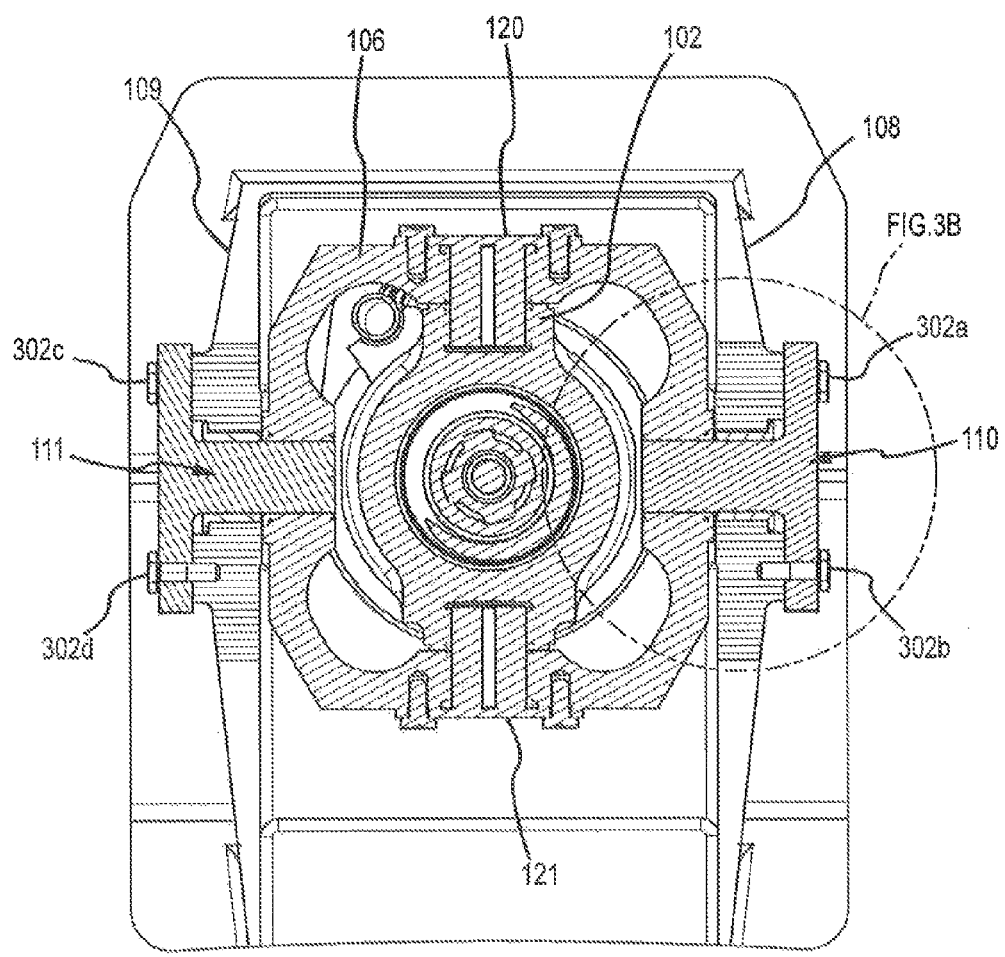
FIG. 3A illustrates, in accordance with various embodiments, a cross-sectional view of a thrust reverser actuator gimbal assembly.
Figure 3B:
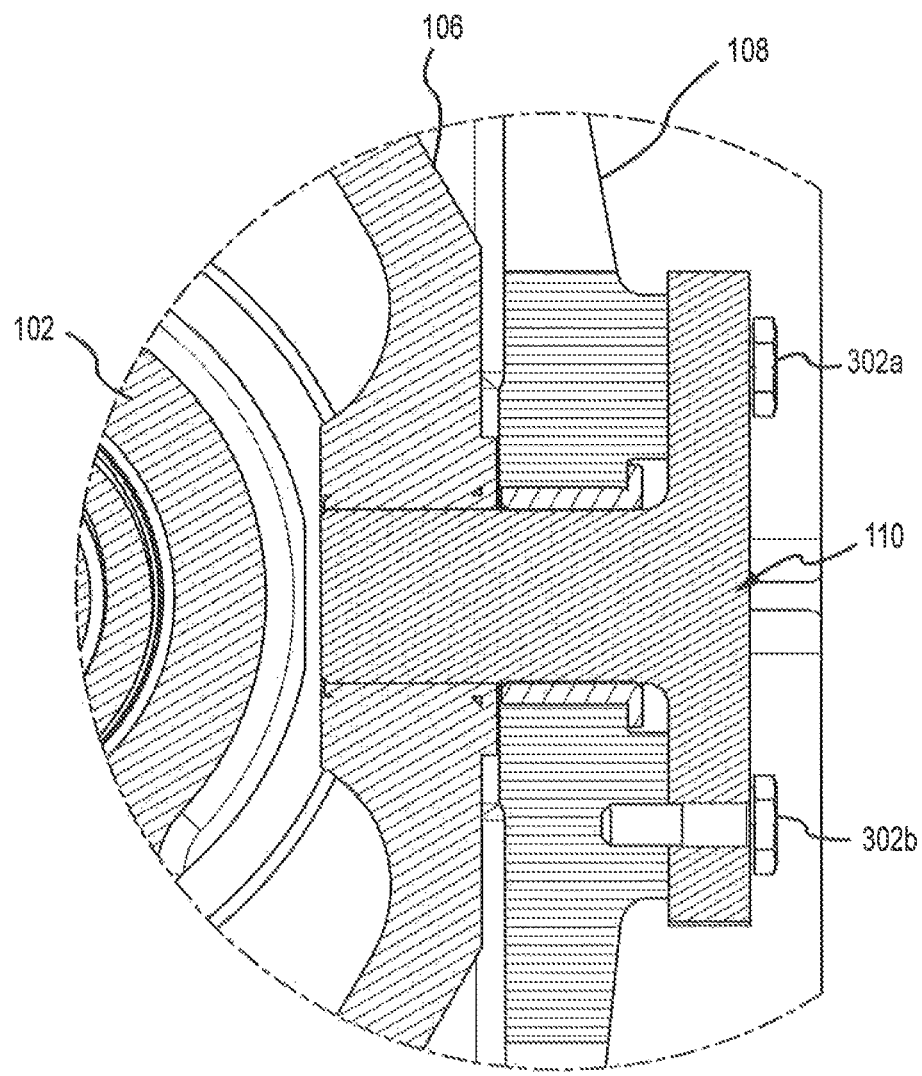
FIG. 3B illustrates, in accordance with various embodiments, a cross-sectional view of the detail area indicated in FIG. 3A.

As shown with respect to FIGS. 3A and 3B, the gimbal pin 110 and an identical gimbal pin 111 may pivotally couple a plurality of front fittings 108 and 109, respectively, to the gimbal 106. Gimbal pins 110 and 111 are positioned in a set of aligned bores formed in the front fittings 108, 109 and the gimbal 106. The one or more apertures (e.g., 206a and/or 206b) formed in a flange (e.g., the flange 202) may receive one or more coupling members 302a, 302b, 302c, and/or 302d. The coupling members 302a-302d may secure the gimbal pins 110 and 111 to their respective front fittings 108 and 109 and prevent the gimbal pins 110 and 111 from rotating or falling out their respective bores. Gimbal pins 120 and 121 are positioned in a set of aligned bores formed in the gimbal 106 and the actuator 102. The actuator 102 can pivot with respect to the first axis defined by gimbal pins 110 and 111, and with respect to a second axis which is normal to the first axis and defined by gimbal pins 120 and 121.

Figure 4:
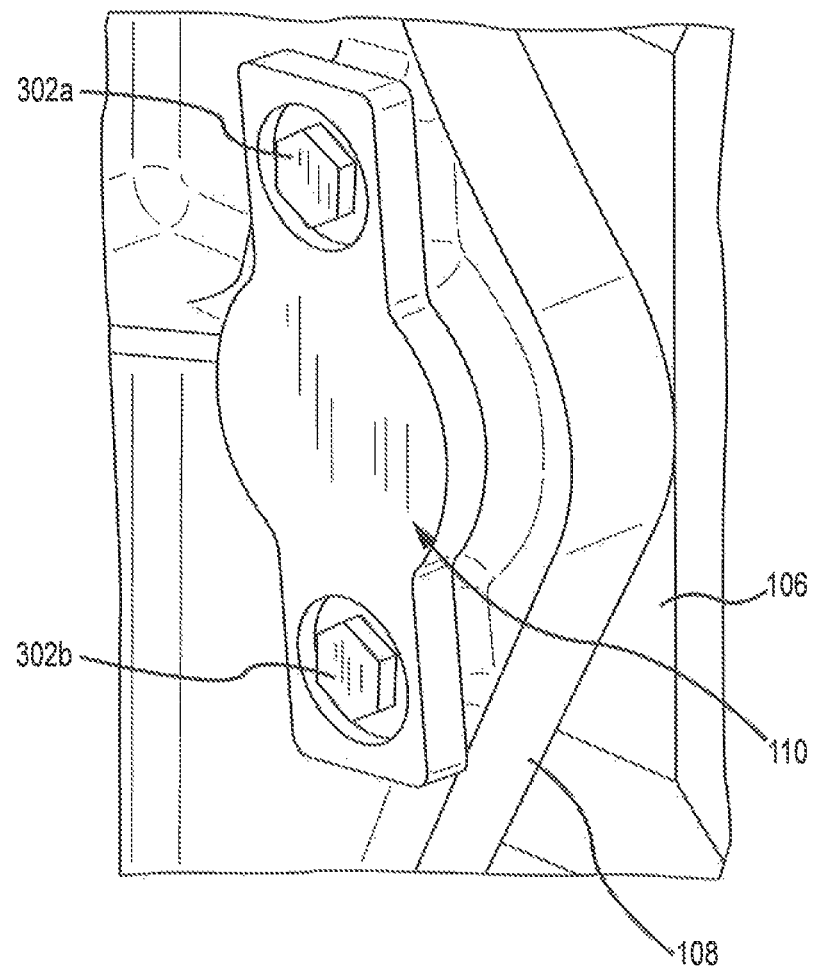
FIG. 4 illustrates, in accordance with various embodiments, a perspective view of a thrust reverser actuator gimbal assembly.

With reference to FIG. 4, a side perspective view of a gimbal pin 110 coupled through a front fitting 108 is shown. As described herein, the gimbal pin 110 may pivotally mount the gimbal 106, as shown in FIG. 3A, to the front fitting 108 of the torque box 104.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more," Moreover, where a phrase similar to "at least one of A, B, sir C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "various embodiments", "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element, herein is to be construed under the provisions of 35 U.S.C. 112(f) unless the element is expressly recited using the phrase "means for," As used herein, the terms "comprises," "comprising," or any other variation thereof, are intended to cover a nonexclusive inclusion, such that a process, method, article, or apparatus that comprises a list of elements does not include only those elements but may include other elements not expressly listed or inherent to such process, method, article, or apparatus.

We claim:

1. A thrust reverser actuator gimbal assembly for mounting a thrust reverser actuator to a fixed structure of a thrust reverser, the gimbal assembly comprising:
    a gimbal;
    first and second gimbal pins mounted to the gimbal and defining a first pivot axis, the first and second gimbal pins adapted to form a first pivotal joint with the fixed structure of the thrust reverser;
    third and fourth gimbal pins mounted to the gimbal and defining a second pivot axis normal to the first pivot axis, the third and fourth gimbal pins adapted to form a second pivotal joint with the thrust reverser actuator; and
    wherein the first and second gimbal pins each include a shaft and a flange integrally formed together, the flange including a pair of bores for receiving a fastener to fasten the respective gimbal pin to the thrust reverser fixed structure.

2. The thrust reverser actuator gimbal assembly of claim 1, wherein each shaft of the respective first and second gimbal pin extends perpendicular to its respective integrally formed flange.

3. The thrust reverser actuator gimbal assembly of claim 1, wherein each shaft and flange of the respective first and second gimbal pins are forged as a single component.

4. A thrust reverser actuator gimbal assembly comprising:
    a gimbal;
    an extendable thrust reverser actuator;
    first and second gimbal pins defining a first pivot axis, the first and second gimbal pins adapted to form a first pivotal joint with a fixed structure of a thrust reverser;
    third and fourth gimbal pins mounted between the gimbal and the thrust reverser actuator and creating a second pivotal joint therebetween, and defining a second pivot axis normal to the first pivot axis; and
    wherein the first and second gimbal pins each include a shaft and a flange integrally formed together, the flange including a pair of bores for receiving a fastener to fasten the respective gimbal pin to the thrust reverser fixed structure.

5. The thrust reverser actuator gimbal assembly of claim 4, wherein the flange and the shaft are forged as a single component.

6. The thrust reverser actuator gimbal assembly of claim 4, wherein the fixed structure comprises a front fitting forming a portion of the thrust reverser.

7. The thrust reverser actuator gimbal assembly of claim 6, wherein the front fitting couples to a torque box of the thrust reverser fixed structure.

* * * * *